United States Patent Office 3,180,706
Patented Apr. 27, 1965

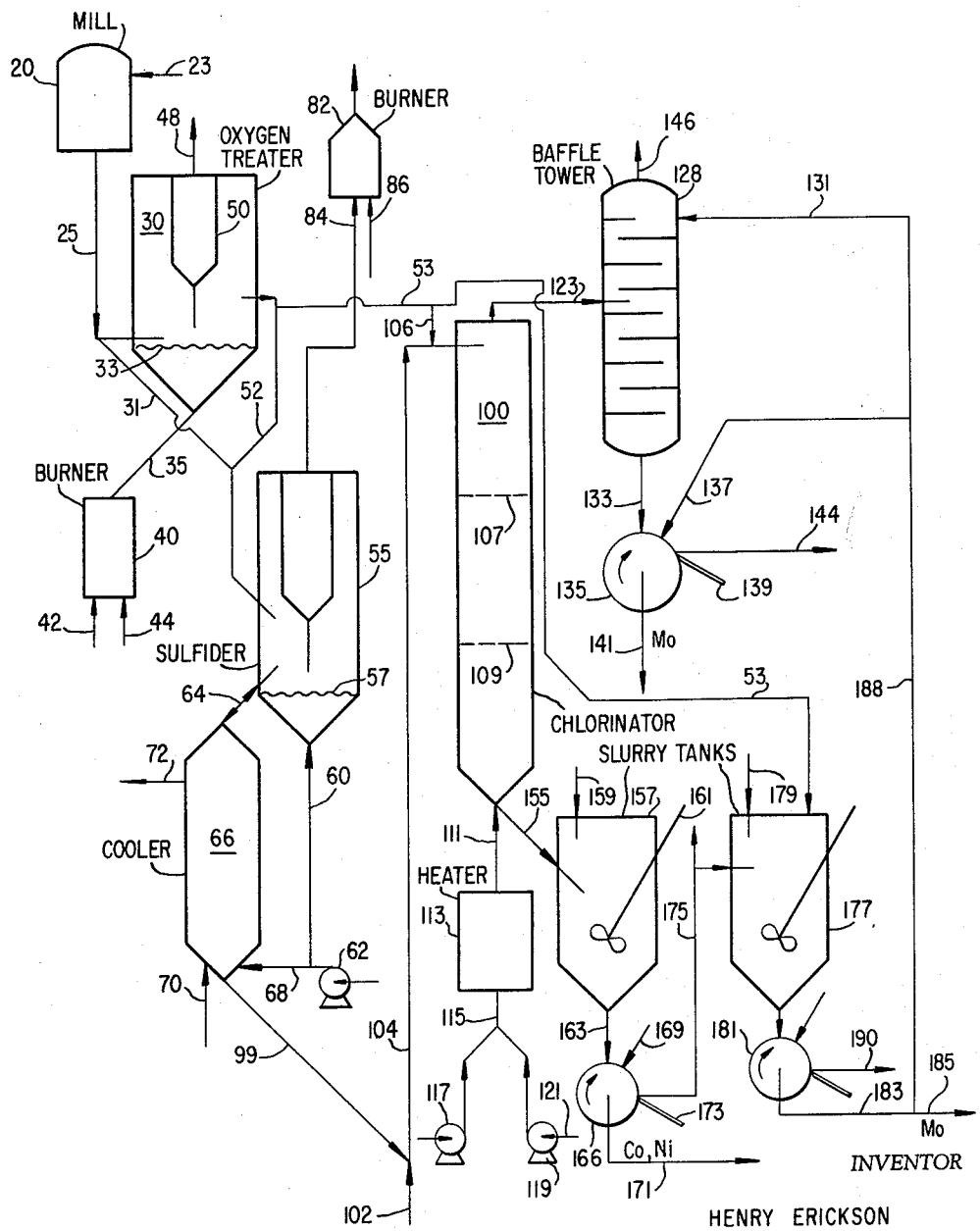

3,180,706
METHOD FOR THE RECOVERY OF METAL VALUES FROM A SPENT HYDROCARBON CONVERSION CATALYST
Henry Erickson, Park Forest, Ill., assignor, by mesne assignments, to Sinclair Research, Inc., New York, N.Y., a corporation of Delaware
Filed May 25, 1961, Ser. No. 112,652
12 Claims. (Cl. 23—87)

This invention is a method for the recovery of metal values from spent hydrocarbon conversion catalysts. Increased needs for petroleum products have led to the manufacture and us of prodigious quantities of metal-promoted hydrocarbon conversion and refining catalysts. For example, hydrogenation processes, such as hydrodesulfurization, use large amounts of catalysts which comprise molybdenum and a group VIII metal of atomic number 27 to 28, that is, cobalt and/or nickel, on alumina. These catalysts, after considerable use, reach a state where their effectiveness as catalysts is severely diminished. They are then discarded from petroleum processing and, at the present time, large dumps of this and other spent catalysts are growing. These catalysts usually are synthetic gel based catalysts, that is, they are made by deposition of nickel or cobalt and molybdenum from a solution or slurry of salts of these metals on an alumina, silica, or silica-alumina base or substrate which generally has been precipitated from a solution of salts of silicon and/or aluminum. Also, sometimes the base or substrate may be a clay or acid-treated and/or partially dehydrated clay.

The spent catalysts are frequently rich in valuable materials containing more than about 1% molybdenum and 0.5% cobalt or nickel. For example, some popular hydrogenation catalysts contain about 5–10% molybedum, and 1–4% cobalt, essentially the balance being alumina. Even though these spent catalysts are richer in these valuable metals than many ores, there has been little success in recovering these metal values, perhaps because the metal compound in the spent catalyst material is amorphous while conventional ore treating processes are practiced for the recovery of crystalline materials. Treatment practices have now been discovered by which one or more of the heavy-metal values of these used catalysts may be recovered. For recovery of molybdenum along with cobalt and/or nickel, treatment of the spent catalysts with molecular-oxygen-containing gas at an elevated temperature, followed by high temperature sulfiding of the catalyst, moderate temperature chlorination and an aqueous wash treatment serves to remove most of the heavy metal values from the catalyst and puts these values in a readily recoverable form, whence they may be used for known purposes, including new catalyst manufacture. Repeated treatments also give a relative pure alumina which may be used for metallurgical purposes. A final basic wash may be employed for more complete molybdenum recovery, or, where only molybdenum is to be recovered, this basic wash may be preceded by merely the elevated temperature oxygen gas treatment with or without chlorination. Likewise, where only cobalt and/or nickel recovery is sought, the oxygen treatment may be eliminated and the basic aqueous wash omitted.

Catalysts used in petroleum processing, containing large amounts of catalytically active metals are known as "promoted" catalysts. The catalyst base is generally of the solid refractory metal oxide type, for instance silica, alumina, magnesia, titania, etc., or their mixtures. The catalyst bases which have received the widest acceptance today are usually predominantly alumina or silica, that is alumina- or silica-based, and may contain solid oxide promoters, e.g., magnesia, etc. Molybdenum is a favorite promoting metal, and is generally used in combination with a group VIII promoter, especially those of atomic number 27 and 28, that is, cobalt and/or nickel. These heavy metal oxide promoters usually total less than about 35% of the catalyst, preferably about 5 to 25%. These compositions are generally calcined to a state of very slight hydration before use in processing.

Catalysts are used as particles having a size suitable for the manipulations encountered in their use. Hydrodesulfurization processes are generally performed using a fixed or moving bed of catalyst which generally is macrosized, that is, in bead or pellet form, perhaps as large as about ½ inch in length and about ¼ inch in diameter and usually at least about 1/16 inch in these dimensions. The treating process of this invention preferably is performed upon catalyst, for instance having particles predominantly in the approximate 20 to 150 micron range, which is disposed as a fluidized bed in the reaction zones to which the reagents are applied continuously in the vapor phase. Spent catalyst of larger particle size may be prepared for the process of this invention by conventional comminuting techniques, such as in a ball or hammer mill.

It has been discovered that vapor phase chlorination at a moderately elevated temperature can remove large amounts of molybdenum from a catalyst as a volatile chloride and can convert cobalt and nickel to their water-soluble chloride form. Also, a preliminary treatment of the catalyst at an elevated temperature with molecular oxygen-containing gas and high temperature sulfiding of the catalyst before chlorination improves metals removal.

Treatment of the spent catalyst with molecular oxygen-containing gas is performed at a temperature generally in the range of about 1050° F. to 1800° F. or more. Little or no effect on molybednum removal is accomplished by treatment below about 1000° F., even for an extended time. The practical upper limit will usually be below about 1800° F. Preferably a temperature of about 1200–1400° F. is used and a pressure from atmospheric to about 1000 p.s.i.g., preferably up to about 15 p.s.i.g. is imposed. In general the oxygen treatment may last for about 24 or more hours, preferably for about 1–6 hours. If any significant amount of carbon is present on the catalyst at the start of this high-temperature treatment, the essential oxygen contact is that continued after carbon removal. In any event, after carbon removal, the oxygen treatment of the essentially carbon-free spent catalyst is at least long enough to provide by conversion or otherwise a substantial amount of molybdenum in its highest valence state, as evidenced by a significant increase, say at least about 10%, preferably at least about 100%, in the molybdenum removal in subsequent stages of the process. The duration of the treatment and the amount of molybdenum prepared by the treatment for later removal is dependent on the temperature and characteristics of the equipment used. The length of the treatment may vary from the short time necessary to produce an observable effect to a time just long enough not to be impractical. The oxygen-containing gas used in the treatment contains molecular oxygen as the essential active ingredient. The gas may be oxygen, or a mixture of oxygen with inert gas, such as air or oxygen-enriched air. The proportion of oxygen in the treating gas may range widely, e.g., from about 2 to 100 mole percent, but generally will be at least about 15%.

The sulfiding step can be performed by contacting the spent catalyst with elemental sulfur vapors, or more conveniently by contacting the catalyst with a volatile sulfide, such as $H_2S$, $CS_2$ or a mercaptan. The contact with the sulfur-containing vapor can be performed at a pressure from atmospheric to about 1000 p.s.i.g. and an elevated temperature generally in the range of about 500 to 1500 or 1600° F. or more, preferably about 800 to 1300° F. Other treating conditions can include a sulfur-containing vapor partial pressure of about 0.1 to 30 p.s.i.g. or more, preferably about 0.5–15 p.s.i.g. Hydrogen sulfide is the preferred sulfiding agent. The sulfiding gas may contain about 10 to 100 mole percent $H_2S$, preferably at least about 80 mole percent $H_2S$. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 24 hours or more depending on these conditions; usually about 1–6 hours is a sufficient time. Temperatures of about 900 to 1200° F. and pressures approximating 1 atmosphere or less seem near optimum for sulfiding and this treatment, often continues for at least 1 or 2 hours but the time, of course, can depend upon the manner of contacting the catalyst and sulfiding agent and the nature of the treating system, e.g., batch or continuous, as well as the rate of diffusion of sulfiding agent within the catalyst matrix.

After sulfiding, the catalyst generally is cooled and then it is chlorinated to convert some of the molybdenum to volatile form and cobalt and nickel to water dispersible form. The conversion to chloride may use vapor-phase techniques which take place at a moderately elevated temperature of about 300° F. to say about 1500° F. or more, preferably about 550 to 700° F., with optimum results being obtained close to about 600° F. In this range, molybdenum chloride or oxychloride vaporizes from the catalyst, but not cobalt or nickel chloride. The chlorinating reagent is a vapor which contains chlorine, preferably in combination with carbon or sulfur. The chlorinating agent is essentially anhydrous, that is, if changed to the liquid state no separate aqueous phase would be observed. As the amount of water in the chlorinating agent increases, additional time and/or chlorinating agent may be required to obtain a given amount of metal removal. This inhibiting effect is also evident when water is present in the catalyst so that it is preferred that the catalyst contain less than about 1 or 2% volatile matter, that is, matter which is removable by heating in inert gas to 1000° C. A pressure of about 0–100 or more p.s.i.g., preferably 0–15 p.s.i.g. may be maintained in chlorination, the contacting usually lasting for at least about five minutes, preferably about 15 minutes to an hour, but shorter or longer reaction periods may be possible or needed, for instance, depending on the linear velocity of the chlorinating vapors.

A chlorinating mixture may contain as one component molecular chlorine or hydrogen chloride or their mixture and as the other component a vaporizable carbon or sulfur compound of chlorine. Either component may be present as the major constituent of the mixture, but generally the other component is present in an amount sufficient to enhance the chlorination; that is, the conversion to chloride which would be achieved without the presence of the second component, under any given set of conditions. The latter-named covalent chlorine compounds, it has been discovered, provide for more effective metals removal and enable chlorination to be performed at a temperature lower than is required for chlorination using the molecular or electrovalent form of chlorine.

In the presence of the carbon or sulfur compound of chlorine, molecular chlorine, besides serving to convert metals to chlorides, appears also to have the effect of keeping the molybdenum in its higher valence state whereby it may more readily be converted to its volatile pentachloride or oxychloride.

Also, it has been found that a carbon or sulfur compound component of the mixture may be provided in less amounts when molecular chlorine or HCl is present, while still resulting in substantial effective conversion of molybdenum to its chloride at the moderate temperatures of the process. This perhaps is due to regeneration of the covalent compound in situ during the chlorination. Molecular chlorine and HCl are considerably less expensive than, say carbon tetrachloride or other promoter and thus the chlorinating mixtures are economically attractive.

The carbon compounds which are of value as promoters are advantageously the chlorine-substituted light hydrocarbons, such as carbon tetrachloride, which may be used as such, or formed in-situ when, for example, a vaporous mixture of chlorine gas with low molecular weight hydrocarbons such as methane, n-pentane, etc., is employed. Useful inorganic sulfur-containing compounds include the volatilizable sulfur chlorides; viz, sulfur monochloride, $S_2Cl_2$, sulfur dichloride, $SCl_2$, thionyl chloride, $SOCl_2$, and sulfuryl chloride, $SO_2Cl_2$. Hydrogen sulfide or other suitably reactive sulfur-containing material may be used with chlorine for in situ generation of the covalent sulfur compound, but the reaction by-products, such as additional HCl formed, may present a waste disposal problem. Sulfur dichloride may be supplied to the chlorination procedure as a liquid and upon vaporization will give a mixture of sulfur monochloride and chlorine. Also, the chlorinating agents may be mixed with another gas such as nitrogen that is inert in this system.

The stoichiometric amount of chlorine required to convert the molybdenum, cobalt and nickel to be recovered from the catalyst to their most highly chlorinated compounds is the minimum amount of total chlorine ordinarily used. However, since the stoichiometric amount of chlorine frequently is small a much larger amount of chlorine, say about 20–100 percent active chlorinating agent based on the weight of the catalyst is used in the practice of the invention. The promoter, that is, the covalent chlorine compound, is generally used in the amount of about 1–10 or 20 percent or more, preferably about 5–8 percent, based on the weight of the catalyst for good molybdenum removal; however, even if less than this amount is used, a considerable improvement in molybdenum conversion is obtained over that which is possible at the same temperature using chlorine alone. The amount of promoter may vary depending upon the manipulative aspects of the chlorination step, for example, a batch treatment may sometimes require more promoter than a continuous treatment for the same degree of effectiveness and results. The chlorine and promoter may be supplied individually or as a mixture to the spent catalyst or, as pointed out above, as a material suitable for generation of such a mixture in situ. Such a mixture may contain about 0.1 to 50 parts chlorine or HCl per part of promoter, preferably about 1–10 parts per part of promoter. A chlorinating gas comprising about 20–50 weight percent chlorine, based on the catalyst, together with one percent or more $S_2Cl_2$ gives good results. Preferably, such a gas provides 30–40 percent $Cl_2$ and about 6 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$; 5–10 parts $Cl_2$ or HCl.

As pointed out, the chlorination reaction proceeds to convert molybdenum to its chloride and to remove some of the volatile chloride. When the chlorination is performed at a temperature too low to volatilize sufficient of the chloride, the chlorination treatment may be followed, or interrupted, by a purge of the catalyst with an inert gas. The purging usually need be performed at a temperature no higher than about 700° F. The chlorination may take about 5 to 120 minutes, more usually about 20 to 60 minutes, but shorter or longer reaction periods may be possible or needed, for instance, depending on the linear velocity of the chlorinating and purging vapors.

The chlorinator effluent contains molybdenum in chloride form. The chloride may be condensed from the vapors by cooling, for example, by air, and collected in a bag filter. The resulting MoCl$_5$ powder can then be treated for recovery of the metal values by conventional processes, for example, by smelting, electrolytic or other reduction practices. Alternatively, the molybdenum chloride may be cooled by countercurrent contact with an aqueous alkaline solution in a baffle tower. This solution may be freed from precipitated components by filtration and concentrated for reprecipitation of molybdenum in catalyst manufacture or recovery of molybdenum for other uses.

After conversion of cobalt and/or nickel to chloride form, the catalyst is washed with an aqueous medium to dissolve the chlorides. The aqueous medium, for best removal of these metals and prevention of cobalt and/or nickel reprecipitation is generally somewhat acidic, and this condition is usually brought about, at least initially, by the presence of chlorides or some entrained chlorine on the catalyst. The aqueous medium can contain extraneous ingredients in trace amounts, so long as the medium is essentially water and the extraneous ingredients do not interfere with recovery of metal values. Ambient temperatures can be used in the wash but temperatures of about 150° F. to the boiling point of water are sometimes helpful. Pressures above atmospheric may be used but the results usually do not justify the additional equipment. In order to avoid undue solution of alumina from the chlorinated catalyst, contact time in this stage is preferably held to about 3 to 5 minutes which is sufficient for chloride removal. The metal values contained in the solution of cobalt and/or nickel chloride may be recovered by well-known conventional procedures, such as precipitation with metallic zinc.

After washing with a slightly acid medium, or, as mentioned previously, when only molybdenum is to be recovered, directly after the treatment with oxygen-containing gas or after oxygen-treatment and chlorination, residual molybdenum on the catalyst may be removed by washing the spent catalyst with a basic aqueous solution. The pH of this solution is frequently greater than 7.5 and the solution preferably contains sodium ions although basicity may be imparted by the use of other materials such as ammonia. An aqueous solution of sodium hydroxide is preferred. The preferred solutions have a pH of about 8 to 11. The amount of sodium ion in the solution is sufficient to give the desired molybdenum removal. The sodium-molybdenum solution is removed from the catalyst and may be treated by conventional methods to recover molybdenum. Preferably this solution may be combined with the molybdenum solution obtained from cooling the chlorinator effluent vapor, or even may be supplied with enough sodium for use as the cooling medium in the baffle tower after dissolving molybdenum from the catalyst. The catalyst may be sent to waste, or, where a significant amount of metals remains on the catalyst particles, it may be recycled to the metals recovery steps, perhaps mixed with untreated waste catalyst.

The invention will be better understood by reference to the accompanying drawing which represents schematically a preferred system for performing the invention.

In the drawing 20 represents a ball mill or other comminuting device for spent catalyst supplied from source 23 and suitable for breaking up the spent catalyst to particles in a fluidizeable size range. Particles leave the mill by line 25 and are conducted to oxygen treater 30, or when no molybdenum is to be recovered, to line 31. Oxygen-treater 30 has the gas-dispersing screen 33. In the oxygen treater the catalyst is fluidized in a flow of free oxygen-containing gas from the line 35. This gas is given a temperature sufficiently high to raise the catalyst particles to the desired 1050°–1800° F. range by passage through the burner 40 of air from the line 42 and fuel from the line 44. Exhaust oxygen treating gas leaves by the line 48 after passage through the cyclone separator 50 for disentrainment of catalyst fines.

Catalyst particles pass by lines 52 or 53 from the oxygen treater. Line 52, used when cobalt and/or nickel is to be recovered along with molybdenum, leads to the sulfider 55. Line 31, used when no molybdenum is to be recovered also leads to the sulfider 55 which is provided with the gas dispersion plate or screen 57. Sulfiding gas passes to the sulfider 55 primarily as a fluidizing flow from line 60 and pump 62. Sulfiding gas may also be brought to the sulfider 55 by line 64 from the catalyst cooler 66. The temperature of the catalyst leaving the oxygen treater is usually sufficient to maintain the sulfiding temperature. Sulfided catalyst passes from the fluidized bed in 55 through line 64 to the cooler 66 where it passes in a direct or indirect heat exchange relationship with a cooling and/or fluidizing flow of sulfiding gas and/or air. Sulfiding gas is supplied by line 68; air by line 70. Air may leave the cooler by line 72. Effluent gases from the sulfider pass to incinerator 82 by line 84 where they are burned by air from line 86.

In the cooler 66 the temperature of the catalyst falls from the temperature of sulfiding to the chlorination temperature of about 500 to 1000° F. After the catalyst has cooled sufficiently it is withdrawn from the cooler 66 by the pipe 99 for passage to the chlorinator 100. A conveying fluid, preferably air from the line 102 conveys the catalyst through line 104 to the chlorinator 100. Catalyst may also be brought to the chlorinator from line 53 by line 106 when only molybdenum is to be recovered.

The chlorinator is generally an elongated chamber made of Monel or other chlorine resistant material and may be provided with one or a plurality of internal grids 107, 109, for gas distribution and break up of catalyst particle agglomerates. The chlorinating agent is brought to the chlorinator 100 from the conduit 111 and heater 113. The heater is provided to give the agent the required temperature of chlorination. The chlorinating agent enters the heater 113 from the mixing conduit 115, having been pumped into this conduit by one or both of the pumps 117 and 119 which lead from suitable sources of the components which make up the chlorinating agent; for example, pump 117 may be connected with a source of chlorine gas while pump 119 is connected to a source of carbon tetrachloride by line 121.

The drawing shows apparatus for recovering metals and excess chlorinating agent from the chlorinator 100. In the recovery apparatus shown, which is exemplary of various systems which can be adopted for recovery of the molybdenum and various chlorinating agents mentioned above, the chlorination effluent vapor is withdrawn from the chlorinator by the line 123 to the baffle tower 128 which is supplied with aqueous sodium hydroxide by line 131. This solution, passing countercurrently to chlorinator effluent gases, cools the gases, condensing and dissolving the molybdenum component, e.g., as the molybdate. The chlorination promoter and other materials insoluble in an alkaline aqueous medium condense and the resulting slurry passes out of the tower by line 133 to the filter 135 which preferably is a rotating drum vacuum filter. This filter may be supplied with basic wash solution from line 137, and has doctor blade 139. Filtrate is removed by line 141 to settling to separate the aqueous phase from the immiscible chlorination promoter and for recovery of the molybdenum values from the solution. The insoluble precipitate forms a filter cake which is scraped off by doctor blade 139 and leaves by conduit 144 to waste. The gaseous effluent from the baffle tower is removed by line 146.

Treated catalyst leaves the chlorinator 100 by line 155 to the slurry tank 157 for contact with water from line 159. The water may contain acidifying agents or buffering agents to prevent alumina solution. The tank may be provided with stirrer 161. The catalyst slurry leaves by line 163 to filter 165. Water for washing cake on the filter may be supplied by line 169. Filtrate line 171 carries the solution of cobalt and/or nickel chloride to recovery of the metal values. Catalyst cake is scraped from filter 166 by doctor blade 173 and is conveyed away by line 175. This line may lead to waste or alumina recovery or to the additional slurry tank 177 where the cake may be contacted with a NaOH aqueous solution from line 179 which is suitable for removing the amount of molybdenum still present in the catalyst particles. Line 53 also leads to this slurry tank 177 and is used when procedures for cobalt and/or nickel recovery are not employed. The catalyst slurry from tank 177 is sent to filter 181 which produces a filtrate, drawn off by line 183 for recovery of molybdenum values by line 185 or for use in the baffle tower by line 188. The filter cake is carried by conduit 190 to waste or to alumina recovery if such is desired, or the cake may be recycled to the oxygen treater or sulfider for further metals removal.

*Examples*

The following examples are illustrative of the process of this invention but should not be considered as limiting. A spent synthetically prepared hydrodesulfurization catalyst analyzing 9.48% $MoO_3$, 2.39% Co, 0.187% Fe, traces of nickel and vanadium, the balance alumina, was crushed in a hammer mill to fluidizable particle size. The catalyst was fluidized in air for one hour at 1300° F. and then fluidized in $H_2S$ for 2 hours at 1300° F. Chlorination was performed by fluidizing the catalyst in a stream of chlorine saturated with $CCl_4$ for 1½ hours at 600° F. The effluent gases from the chlorinator were partially retained in a room temperature trap. The chlorinated catalyst was washed in dilute HCl, followed by washing in dilute $NH_4OH$. After treatment the catalyst analyzed

|  | Content (percent) | Removal (percent) |
|---|---|---|
| $MoO_3$ | 4.20 | 56 |
| Co | 1.31 | 45 |

The total metals recovery from the chlorinator effluent, the HCl wash and the $NH_4OH$ wash is, per 100 grams of catalyst, 5.31 grams $MoO_3$ and 1.076 grams Co.

In another run, performed on this same spent catalyst, only the treatment with molecular oxygen-containing gas and the ammonia wash is performed. The molybdenum recovery is almost as great as in the previous example.

A spent catalyst similar to that treated in the previous examples, but containing about 2.5% Ni, rather than Co, is treated as in the first example, but the oxygen treatment and ammonia wash are not employed. Nickel recovery is comparable to the cobalt recovery reported above.

It is claimed:

1. A method for the recovery of metal values from a spent solid hydrocarbon conversion catalyst containing molybdenum and a group VIII metal of atomic number 27–28 supported on a solid refractory metal oxide base, which comprises subjecting the catalyst to a gas containing molecular oxygen at a temperature of at least about 1200° F., for a time sufficient to provide a substantial amount of molybdenum at its highest valence state at the catalyst surface, sulfiding the catalyst by contact with a sulfiding vapor at a temperature of at least about 800° F., chlorinating the catalyst by contact with an essentially anhydrous chlorinating vapor at a temperature of at least about 300° F. to convert metal to chloride form, recovering molybdenum compound from the effluent chlorinating vapor, washing the catalyst with a liquid essentially aqueous medium and collecting chloride of said group VIII metal in said aqueous medium.

2. The method of claim 1 in which the catalyst is treated with oxygen, sulfided and chlorinated as a fluidized bed.

3. The method of claim 1 in which oxygen treatment is performed at a temperature of about 1200–1800° F.

4. The method of claim 1 in which sulfiding is performed at a temperature of about 800 to 1500° F.

5. The method of claim 1 in which the sulfiding vapor is $H_2S$.

6. The method of claim 1 in which chlorinating is performed at a temperature of about 550 to 700° F.

7. The method of claim 1 in which the chlorinating vapor is a mixture of chlorine with carbon tetrachloride.

8. The method of claim 1 in which the catalyst is a synthetic alumina-gel based catalyst.

9. A method for the recovery of metal values from a spent solid hydrocarbon conversion catalyst containing a group VIII metal having an atomic number of 27 to 28 supported on a solid refractory metal oxide base, which comprises sulfiding the catalyst by contact with a sulfiding vapor at a temperature of at least about 800° F., chlorinating the catalyst by contact with an essentially anhydrous chlorinating vapor at a temperature of at least about 300° F. to convert metal to chloride form, washing the catalyst with a liquid essentially aqueous medium and collecting chloride of said metal in said aqueous medium.

10. The method of claim 9 in which sulfiding is performed at a temperature of about 800 to 1500° F.

11. The method of claim 9 in which the sulfiding vapor is $H_2S$.

12. The method of claim 9 in which chlorinating is performed at a temperature of about 550 to 700° F.

References Cited by the Examiner

UNITED STATES PATENTS

| 1,923,095 | 8/33 | Jenness | 23—16 X |
| 1,923,652 | 8/33 | Winkler et al. | 23—23 X |
| 2,267,736 | 12/41 | Ipatieff et al. | 252—415 X |
| 2,481,253 | 9/49 | Snyder | 252—415 X |
| 2,813,835 | 11/57 | Nozaki | 252—411 |

FOREIGN PATENTS 546,600   9/57   Canada.

MAURICE A. BRINDISI, *Primary Examiner.*

GEORGE D. MITCHELL, *Examiner.*